United States Patent
Qiao et al.

(10) Patent No.: US 12,490,243 B2
(45) Date of Patent: Dec. 2, 2025

(54) PDCCH TRANSMISSION METHOD AND APPARATUS, AND PDCCH RECEIVING METHOD AND APPARATUS

(71) Applicant: BEIJING XIAOMI MOBILE SOFTWARE CO., LTD., Beijing (CN)

(72) Inventors: Xuemei Qiao, Beijing (CN); Yang Liu, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

(21) Appl. No.: 18/032,156

(22) PCT Filed: Oct. 14, 2020

(86) PCT No.: PCT/CN2020/120984
§ 371 (c)(1),
(2) Date: Apr. 14, 2023

(87) PCT Pub. No.: WO2022/077298
PCT Pub. Date: Apr. 21, 2022

(65) Prior Publication Data
US 2023/0397173 A1      Dec. 7, 2023

(51) Int. Cl.
*H04W 72/0446*  (2023.01)
*H04L 5/00*  (2006.01)
*H04W 72/232*  (2023.01)

(52) U.S. Cl.
CPC ....... *H04W 72/0446* (2013.01); *H04L 5/0051* (2013.01); *H04W 72/232* (2023.01)

(58) Field of Classification Search
CPC ... H04L 5/0051; H04L 5/0053; H04L 5/0094; H04W 52/0216; H04W 52/0229; H04W 72/0446; H04W 72/232; Y02D 30/70
See application file for complete search history.

(56) References Cited

U.S. PATENT DOCUMENTS

| | | | | |
|---|---|---|---|---|
| 10,951,359 B2 * | 3/2021 | Huang | ............... | H04W 72/23 |
| 11,206,651 B2 * | 12/2021 | Wang | ................. | H04W 72/23 |
| 11,284,362 B2 * | 3/2022 | Talarico | ................ | H04L 5/001 |
| 11,405,866 B2 * | 8/2022 | Kim | ..................... | H04W 72/23 |
| 11,523,291 B2 * | 12/2022 | Salah | .................... | H04W 76/27 |
| 11,546,783 B2 * | 1/2023 | Lin | ...................... | H04W 76/28 |
| 11,665,639 B2 * | 5/2023 | Cheng | .............. | H04W 52/0235 370/311 |

(Continued)

FOREIGN PATENT DOCUMENTS

| | | |
|---|---|---|
| CN | 107820318 A | 3/2018 |
| CN | 109391387 A | 2/2019 |

(Continued)

OTHER PUBLICATIONS

International Search Report of PCT/CN2020/120984 dated Jul. 15, 2021 with English translation, (4p).

(Continued)

*Primary Examiner* — Eric Nowlin
(74) *Attorney, Agent, or Firm* — Arch & Lake LLP

(57) ABSTRACT

A physical downlink control channel (PDCCH) transmission method, applicable to a base station, includes: transmitting, in multiple slots, PDCCHs to a UE; wherein the PDCCHs in at least two slots of the multiple slots are consecutive in time domain.

16 Claims, 8 Drawing Sheets

Transmitting, in multiple slots, PDCCHs to a user equipment (UE); wherein the PDCCHs in at least two slots of the multiple slots are consecutive in time domain.  ~ S101

(56) References Cited

U.S. PATENT DOCUMENTS

| | | | |
|---|---|---|---|
| 11,678,330 B2* | 6/2023 | Hwang | H04W 72/0446 370/329 |
| 12,035,242 B2* | 7/2024 | Wu | H04W 72/23 |
| 12,185,410 B2* | 12/2024 | Zhou | H04W 52/0229 |
| 12,232,129 B2* | 2/2025 | Li | H04W 72/1263 |
| 12,250,633 B2* | 3/2025 | Seo | H04L 5/0048 |
| 12,289,680 B2* | 4/2025 | Seo | H04W 76/28 |
| 2018/0199313 A1* | 7/2018 | Suzuki | H04H 40/18 |
| 2018/0375623 A1* | 12/2018 | Suzuki | H04W 72/04 |
| 2019/0053177 A1* | 2/2019 | Niu | H04L 27/26025 |
| 2019/0222357 A1* | 7/2019 | Huang | H04W 72/0446 |
| 2020/0053757 A1* | 2/2020 | Bagheri | H04L 5/10 |
| 2020/0100223 A1* | 3/2020 | Park | H04L 5/10 |
| 2020/0154295 A1* | 5/2020 | Lin | H04W 24/08 |
| 2020/0196282 A1* | 6/2020 | Wang | H04W 4/06 |
| 2020/0204293 A1* | 6/2020 | Kim | H04W 72/23 |
| 2020/0266964 A1* | 8/2020 | Kang | H04W 72/23 |
| 2020/0351681 A1* | 11/2020 | Salah | H04W 76/28 |
| 2020/0351774 A1* | 11/2020 | Liao | H04W 76/28 |
| 2020/0351777 A1* | 11/2020 | Kim | H04W 72/23 |
| 2020/0351784 A1* | 11/2020 | Tsai | H04L 5/0094 |
| 2021/0029726 A1* | 1/2021 | Papasakellariou | H04W 72/53 |
| 2021/0051584 A1* | 2/2021 | Cheng | H04W 76/28 |
| 2021/0297997 A1* | 9/2021 | Hwang | H04W 76/28 |
| 2022/0039009 A1* | 2/2022 | Iyer | H04L 5/0098 |
| 2022/0104132 A1* | 3/2022 | Wu | H04W 72/23 |
| 2022/0225470 A1* | 7/2022 | Zhou | H04W 68/02 |
| 2022/0232601 A1* | 7/2022 | Lin | H04L 1/1812 |
| 2022/0264464 A1* | 8/2022 | Seo | H04L 5/0053 |
| 2022/0279564 A1* | 9/2022 | Li | H04W 72/0446 |
| 2022/0295405 A1* | 9/2022 | Seo | H04W 76/28 |
| 2022/0345920 A1* | 10/2022 | Liu | H04W 24/08 |
| 2022/0353809 A1* | 11/2022 | Maleki | H04W 76/28 |
| 2023/0027316 A1* | 1/2023 | Xu | H04L 5/0051 |
| 2023/0117080 A1* | 4/2023 | Lei | H04L 5/0051 370/329 |
| 2023/0122950 A1* | 4/2023 | Wei | H04W 72/232 370/329 |
| 2023/0156722 A1* | 5/2023 | Li | H04W 52/0229 370/329 |
| 2023/0232416 A1* | 7/2023 | Wang | H04W 72/232 370/329 |
| 2023/0283438 A1* | 9/2023 | Zhang | H04L 5/0053 370/329 |

FOREIGN PATENT DOCUMENTS

| | | | |
|---|---|---|---|
| CN | 109804695 A | | 5/2019 |
| CN | 110012524 A | | 7/2019 |
| CN | 110199550 A | | 9/2019 |
| CN | 110537386 A | | 12/2019 |
| CN | 110635877 A | | 12/2019 |
| CN | 110831125 A | | 2/2020 |
| CN | 110999479 A | | 4/2020 |
| CN | 111492613 A | | 8/2020 |
| CN | 111615179 A | | 9/2020 |
| WO | 2018145019 A1 | | 8/2018 |
| WO | 2020091422 A1 | | 5/2020 |
| WO | WO-2020253612 A1 * | 12/2020 | H04L 5/0007 |

OTHER PUBLICATIONS

TCL, "Preemption Indication Details for eMBB URLLC Multiplexing",3GPP TSG RAN WG1 Meeting #89 R1-1708266 Hangzhou, China May 15-19, 2017,(7p).

3rd Generation Partnership Project; Technical Specification Group Services and System Aspects; Study on enhancements for cyber-physical control applications in vertical domains; Stage 1, (Release 17), 3GPP TR 22.832 V17.4.0 (Mar. 2021),(87p).

3rd Generation Partnership Project; Technical Specification Group Services and System Aspects; Service requirements for cyber-physical control applications in vertical domains; Stage 1 (Release 17),3GPP TS 22.104 V17.4.0 (Sep. 2020),(76p).

3rd Generation Partnership Project; Technical Specification Group Services and System Aspects; Study on Communication for Automation in Vertical Domains (Release 16), 3GPP TR 22.804 V16.3.0 (Jul. 2020), (197p).

The first CNOA issued in Application No. 202080002734.7 dated on Sep. 19, 2022, with English translation, (16p).

Huawei, HiSilicon, "PDCCH reliability for URLLC", 3GPP TSG RAN WG1 NR Ad Hoc Meeting, R1-1709986, Qingdao, China, Jun. 27-30, 2017,(7p).

Apple Inc., "PDCCH based power saving channel design for UE power saving", 3GPP TSG RAN WG1 #99, R1-1912827, Reno, USA, Nov. 18-22, 2019, (11p).

Extended European Search Report of EP 20957078.7 dated Nov. 8, 2023, (10 p).

MediaTek Inc., Connected mode DRX for NB-IOT,3GPP TSG-RAN WG2 Meeting #94 R2-163851, Nanjing, China, May 23-27, 2016, (5 p).

Second Office Action issued to Chinese Application No. 202080002734.7 dated Apr. 12, 2023, (xp).

Feng, Yang "A Low Power Consumption Technology in The Idle State of LTE Terminal", China Academic Journal Electronic Publishing House, 1994-2023, http://www.cnki.net; English Abstract, (6p).

Notice of Allowance of Chinese Application No. 202080002734.7, dated Jul. 28, 2023, (4p).

Kiaowen Li, Research of de-resource mapping algorithm for PDCCH based on transmit diversity signal detection in LTE system, Jun. 3, 2013, publisher: Application Research of Computers, vol. 30 No. 10, China,(6p).

Apple Inc., Control Indicator in Group-common PDCCH for UE Power Saving, 3GPP TSG-RAN WG1 NR#2 R1-1710907 Agenda Item: 5.1.3.1.4.2, Jun. 27-30, 2017, Qingdao, China, (5p).

* cited by examiner

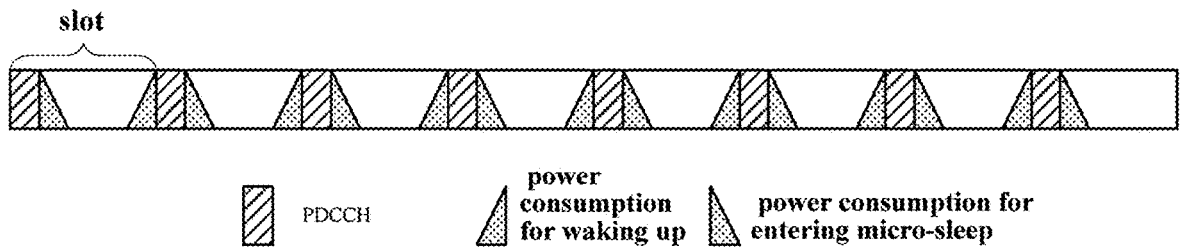
FIG. 1
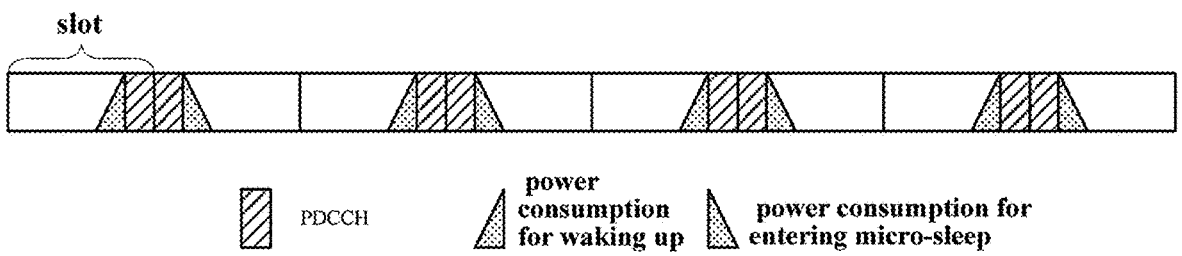
FIG. 2
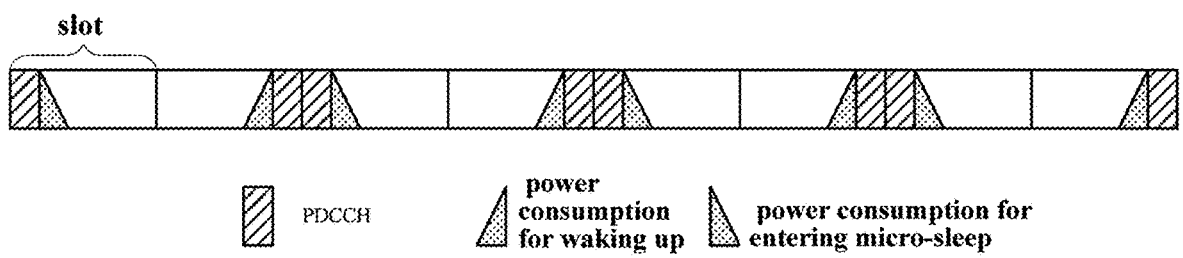
FIG. 3
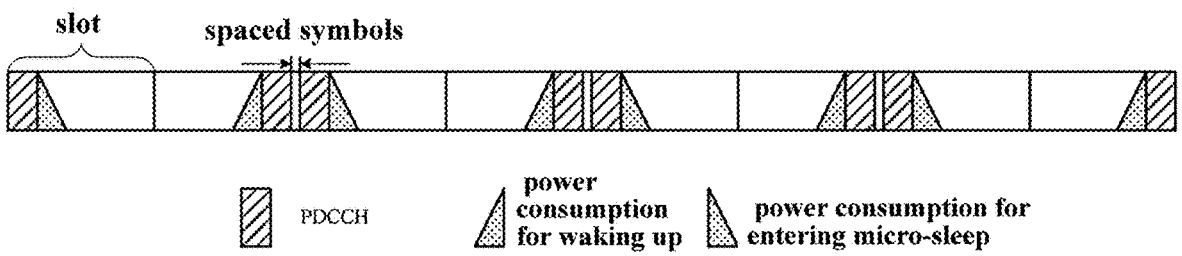
FIG. 4
FIG. 5

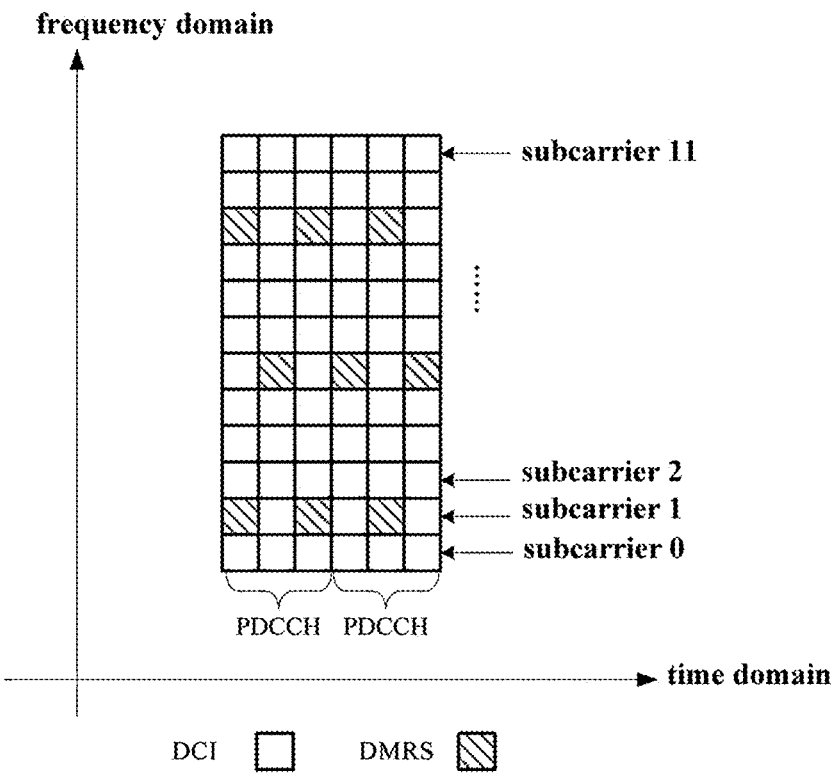

FIG. 8E

| Receiving PDCCHs transmitted by a base station in multiple slots; wherein the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain. |~ S901

FIG. 9

| Receiving PDCCHs transmitted by a base station in multiple slots; wherein the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain. |~ S901

| Determining, based on the PDCCHs in the multiple slots, a downlink control information (DCI) corresponding to a same transport block. |~ S1001

FIG. 10

PDCCH TRANSMISSION METHOD AND APPARATUS, AND PDCCH RECEIVING METHOD AND APPARATUS

CROSS-REFERENCE

The present application is a U.S. National Stage of International Application No. PCT/CN2020/120984, filed on Oct. 14, 2020, the contents of which are incorporated herein by reference in their entireties for all purposes.

BACKGROUND

In related technologies, for certain types of UE (user equipment), low complexity, low cost, power saving, and a certain degree of coverage enhancement are required. For the above requirements of these types of UE, targeted design is needed for the communication process.

SUMMARY

The present disclosure relates to the field of communication technology, in particular to a PDCCH transmission method, a PDCCH receiving method, a PDCCH transmission apparatus, a PDCCH receiving apparatus, an electronic device, and a computer-readable storage medium. In view of this, embodiments of the present disclosure provide a PDCCH transmission method, a PDCCH receiving method, a PDCCH transmission apparatus, a PDCCH receiving apparatus, an electronic device, and a computer-readable storage medium to solve the technical problems in the related technologies.

According to a first aspect of the embodiments of the present disclosure, a physical downlink control channel (PDCCH) transmission method, applicable to a base station, is proposed. The PDCCH transmission method includes:
transmitting, in multiple slots, PDCCHs to a UE;
wherein the PDCCHs in at least two slots of the multiple slots are consecutive in time domain.

According to a second aspect of the embodiments of the present disclosure, a physical downlink control channel (PDCCH) receiving method, applicable to a UE, is proposed.

The PDCCH receiving method includes:
receiving PDCCHs transmitted by a base station in multiple slots;
wherein the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain.

According to a third aspect of the embodiments of the present disclosure, an electronic device is proposed. The electronic device includes:
a processor; and
a memory, configured to store instructions executable by the processor;
wherein the processor is configured to execute the PDCCH transmission method described above.

According to a fourth aspect of the embodiments of the present disclosure, an electronic device is proposed. The electronic device includes:
a processor; and
a memory, configured to store instructions executable by the processor;
wherein the processor is configured to execute the PDCCH receiving method described above.

According to a fifth aspect of the embodiments of the present disclosure, a computer-readable storage medium, storing a computer program, is proposed, wherein the computer program, when executed by a processor, implements steps of the PDCCH transmission method described above.

According to a sixth aspect of the embodiments of the present disclosure, a computer-readable storage medium, storing a computer program, is proposed, wherein the computer program, when executed by a processor, implements steps of the PDCCH receiving method described above.

BRIEF DESCRIPTION OF THE DRAWINGS

In order to more clearly illustrate the technical solutions of the embodiments of the present disclosure, the following is a brief description of the accompanying drawings to be used in the description of the embodiments. It is obvious that the accompanying drawings in the following description are only some embodiments of the present disclosure. For those ordinary skilled in the art, other accompanying drawings can be obtained based on these accompanying drawings without any creative effort.

FIG. 1 is a schematic flowchart of a PDCCH transmission method illustrated according to an embodiment of the present disclosure.

FIG. 2 is a schematic diagram of one type of power consumption illustrated according to an embodiment of the present disclosure.

FIG. 3 is a schematic diagram of a PDCCH illustrated according to an embodiment of the present disclosure.

FIG. 4 is a schematic diagram of another PDCCH illustrated according to an embodiment of the present disclosure.

FIG. 5 is a schematic diagram of yet another PDCCH illustrated according to an embodiment of the present disclosure.

FIG. 8A-FIG. 8E are schematic diagrams of several DMRSs illustrated according to an embodiment of the present disclosure.

FIG. 9 is a schematic flowchart of a PDCCH receiving method illustrated according to an embodiment of the present disclosure.

FIG. 10 is a schematic flowchart of another PDCCH receiving method illustrated according to an embodiment of the present disclosure.

DETAILED DESCRIPTION

Figure 6:
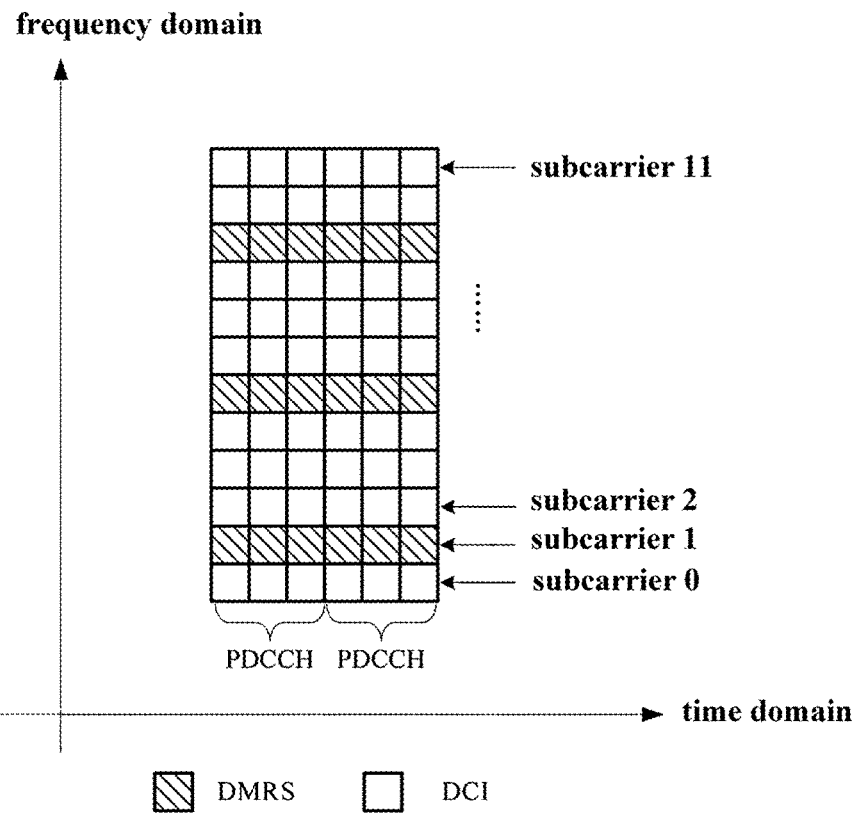
FIG. 6 is a schematic diagram of a DMRS illustrated according to an embodiment of the present disclosure.

The technical solutions of the embodiments of the present disclosure will be clearly and completely described below in conjunction with the accompanying drawings of the embodiments of the present disclosure. It is obvious that the embodiments described are only a portion of the embodiments of the present disclosure, and not all of them. Based on the embodiments of the present disclosure, all other embodiments obtained by those ordinary skilled in the art without making creative labor fall within the scope of protection of the present disclosure.

FIG. 1 is a schematic flowchart of a PDCCH (physical downlink control channel) transmission method illustrated according to an embodiment of the present disclosure. The PDCCH transmission method illustrated in this embodiment is applicable to a base station. The base station includes, but are not limited to, a 4G base station, a 5G base station, and a 6G base station. The base station may communicate with a UE as a user equipment, and the UE includes, but not limited to, a mobile phone, a tablet, a wearable device, a sensor, an IoT device, and other electronic devices.

In one embodiment, the UE may be a UE to which the PDCCH receiving method described in any of the subsequent embodiments applies.

In one embodiment, the UE is a reduced capability UE (a user equipment with reduced capability, or redcap UE for short), or called a NR-lite device. For a UE of this type, low complexity, low cost, power saving, and a certain degree of coverage enhancement are required.

In order to meet the power saving requirements of this type of a UE, the UE may be set to only receive a PDCCH in a slot, and enter a micro-sleep state during periods other than the PDCCH in the slot. To meet its coverage enhancement requirements, the PDCCH may be transmitted multiple times to increase the aggregation level and reduce the code rate. The micro-sleep state is a state in which the UE turns off some RF components and thus maintains relatively low power consumption compared to the wake-up state.

As shown in FIG. 1, the PDCCH transmission method may include the following step S101.

In the step 101, PDCCHs are transmitted to a UE in multiple slots.

Herein, the PDCCHs in at least two slots of the multiple slots are consecutive in time domain.

In one embodiment, the base station may transmit PDCCHs to the UE in multiple slots, the multiple slots may be all consecutive, or some of the slots of the multiple slots may be consecutive. The PDCCHs in at least two slots of the multiple slots are consecutive in the time domain. For example, the PDCCHs in only two slots of the multiple slots are consecutive in the time domain, or the PDCCHs in every two slots of the multiple slots are consecutive in the time domain.

It is noted that the PDCCHs being consecutive in the time domain referred to in all embodiments of the present disclosure may include two cases: one is that the number of symbols (e.g., OFDM symbols) spaced in the time domain between PDCCHs is 0, and the other is that the number of symbols spaced in the time domain between PDCCHs is not 0, but is small, e.g., less than or equal to a preset value. The preset value may be set as needed, such as 2, 3, 4, etc.

In order to meet the UE's requirements for coverage enhancement, the PDCCHs may be transmitted in multiple slots, then the UE can receive the PDCCH in each slot. However, since the UE is in a micro-sleep state during periods other than the PDCCH in each slot, in order to receive the PDCCH, the UE needs to wake up first and re-enter the micro-sleep state after receiving the PDCCH. However, there is power consumption during each wake-up and micro-sleep entry process of the UE.

FIG. 2 is a schematic diagram of one type of power consumption illustrated according to an embodiment of the present disclosure.

For example, as shown in FIG. 2, the base station transmits PDCCHs to the UE in eight slots, each slot contains a PDCCH, and the PDCCH is located at a front end of the slot. Before each reception of the PDCCH, the UE needs to wake up first, thus incurring power consumption for waking up, and after each reception of the PDCCH, the UE needs to enter a micro-sleep state, thus incurring power consumption for entering micro-sleep. Based on the embodiment shown in FIG. 2, there will be at least 7 times of power consumption for waking up and 8 times of power consumption for entering the micro-sleep state, and the total power consumption is large, which is not easy to meet the requirements of the UE for power saving.

According to the embodiments of the present disclosure, when transmitting PDCCHs to a UE in multiple slots, by setting the PDCCHs in at least two slots of the multiple slots to be consecutive in the time domain, the UE can be caused to experience only one wake-up and micro-sleep entry process when receiving the PDCCHs consecutive in the time domain. Compared with inconsecutive transmission of the PDCCHs to the UE, the embodiments of the present disclosure can effectively reduce the power consumption of the UE and make the UE remain in a micro-sleep state for a longer time, thus facilitating meeting the power saving requirements of the UE.

In one embodiment, the PDCCHs transmitted by the base station to the UE may include two modes, or patterns, as shown in FIG. 3 and FIG. 4 below.

FIG. 3 is a schematic diagram of a PDCCH illustrated according to an embodiment of the present disclosure. FIG. 4 is a schematic diagram of another PDCCH illustrated according to an embodiment of the present disclosure.

In one embodiment, the PDCCHs transmitted by the base station to the UE in the multiple slots may be that the PDCCH in an odd slot of the multiple slots is located at a rear end of a corresponding slot, and the PDCCH in an even slot is located at a front end of a corresponding slot.

For example, as shown in FIG. 3, the base station transmits the PDCCHs to the UE in 8 slots, and each slot contains a PDCCH. In the slots of 1, 3, 5, and 7, the PDCCH is located at the rear end of the slot, and in the slots of 2, 4, 5, and 6, the PDCCH is located at the front end of the slot.

In this way, the PDCCH in the first slot and the PDCCH in the second slot are consecutive in the time domain, the PDCCH in the third slot and the PDCCH in the fourth slot are consecutive in the time domain, the PDCCH in the fifth slot and the PDCCH in the sixth slot are consecutive in the time domain, and the PDCCH in the seventh slot and the PDCCH in the eighth slot are consecutive in the time domain.

For two PDCCHs consecutive in the time domain, the UE may wake up before reception, remain awake during reception and enter a micro-sleep state after reception, and the power consumption is as shown in FIG. 3, where there is power consumption for four wake-ups and four entries into the micro-sleep state, which is reduced relative to the embodiment shown in FIG. 2 to meet the UE's requirements for power saving.

In one embodiment, the PDCCHs transmitted by the base station to the UE in the multiple slots may be that the PDCCH in an odd slot of the multiple slots is located at a front end of a corresponding slot, and the PDCCH in an even slot is located at a rear end of a corresponding slot.

For example, as shown in FIG. 4, the base station transmits the PDCCHs to the UE in 8 slots, and each slot contains a PDCCH. In the slots of 1, 3, 5, and 7, the PDCCH is located at the front end of the slot, and in the slots of 2, 4, 5, and 6, the PDCCH is located at the rear end of the slot.

In this way, the PDCCH in the second slot and the PDCCH in the third slot are consecutive in the time domain, the PDCCH in the fourth slot and the PDCCH in the fifth slot are consecutive in the time domain, the PDCCH in the sixth slot and the PDCCH in the seventh slot are consecutive in the time domain.

For two PDCCHs consecutive in the time domain, the UE may wake up before reception, remain awake during reception and enter a micro-sleep state after reception, and the power consumption is as shown in FIG. 4, where there is power consumption for four wake-ups and four entries into the micro-sleep state, which is reduced relative to the embodiment shown in FIG. 2 to meet the UE's requirements for power saving.

In one embodiment, the PDCCH may occupy from 1 to 3 symbols in the time domain in the slot. Taking the PDCCH occupying 3 symbols as an example, the PDCCH is located at the front end of the slot, meaning that the PDCCH is located in the first 3 symbols of the slot, and the PDCCH is located at the rear end of the slot, meaning that the PDCCH is located in the last 3 symbols of the slot.

Alternatively, the PDCCHs in the multiple slots correspond to a same transport block.

In one embodiment, the PDCCHs transmitted by the base station in the multiple slots may be for a plurality of transport blocks (TBs) or for the same transport block (TB).

Taking the PDCCHs in the multiple slots corresponding to the same transport block as an example, the PDCCH may carry a downlink control information (DCI). The DCI in each PDCCH may be the same, and the UE may determine, based on the PDCCHs in the multiple slots, the DCI corresponding to the same transport block.

Alternatively, the PDCCHs in the at least two slots are consecutive in the time domain includes:

in one embodiment, the PDCCHs in the at least two slots being consecutive in the time domain may be that, the PDCCHs in the at least two slots being separated in the time domain by zero symbol.

Alternatively, the PDCCHs in the at least two slots are consecutive in the time domain includes:

in one embodiment, the PDCCHs in the at least two slots being consecutive in the time domain may be that, the PDCCHs in the at least two slots being separated in the time domain by one or more symbols, and a number of the one or more symbols is greater than zero and less than or equal to a preset value.

Since the PDCCHs in different slots are consecutive, the complexity of blind detections is increased for the UE. For example, for the embodiment shown in FIG. 4, the UE needs to blindly detect the PDCCH in the third slot immediately after blindly detecting the PDCCH in the second slot. This may make it difficult for the UE to perform the blind detection smoothly in the third slot when the UE's processing capacity is low.

By setting consecutive PDCCHs to have a small interval in the time domain, for example, the number of spaced symbols being greater than 0 and less than or equal to a preset value, for example, the number of spaced symbols being 2, 3, etc., the UE can have more time for processing after blindly detecting in one slot and then blindly detecting in the next slot, which is applicable to a UE with a lower processing capacity.

FIG. 5 is a schematic diagram of yet another PDCCH illustrated according to an embodiment of the present disclosure.

As shown in FIG. 5, the PDCCHs in the embodiment shown in FIG. 4 may be adjusted to add intervals between consecutive PDCCHs. Taking the second slot and the third slot in FIG. 5 as an example, after the UE blindly detects the PDCCH in the second slot, there is still a certain interval between the second slot and the third slot. Even if the processing capacity is low, the processing can be completed, and then blind detection can be performed in the third slot, which is applicable to a UE with a lower processing capacity.

It should be noted that in this case, the UE still remains in a wake-up state at the intervals between consecutive PDCCHs.

Alternatively, in response to a position of the UE being stationary, a number of demodulation reference signals (DMRSs) in the PDCCH is a first number, and in response to the position of the UE being nonstationary, the number of the DMRSs in the PDCCH is a second number.

Herein, the first number is less than the second number.

In one embodiment, a DCI and a DMRS may be carried in the PDCCH, and one of the functions of the DMRS is for the UE to combat Doppler frequency offset. The faster the moving speed of the UE, the greater the Doppler frequency offset. Therefore, a larger number of DMRSs are needed to combat Doppler frequency offset. However, for UE that move slowly or even do not move, the Doppler frequency offset is smaller, and a smaller number of DMRSs can combat the Doppler frequency offset.

This embodiment may determine whether the position of the UE is stationary. Whether the position of the UE is stationary may be determined by positioning the UE, or be determined based on the information reported by the UE, or may also be other feasible ways, which can be selected according to the need, and this embodiment is not limited.

For a UE with a stationary position, such as a stationary redcap UE, the number of the DMRSs in the PDCCH transmitted by the base station is the first number, and for a UE with a nonstationary position, the number of the DMRSs in the PDCCH transmitted by the base station is the second number, herein the first number may be less than the second number, i.e., the number of the DMRSs configured for the UE with a stationary position may be less relative to the number of the DMRSs configured for the UE with a nonstationary position, thus reducing the number of the DMRSs carried in the PDCCH, allowing for more DCIs and/or encoding bits to be carried in the PDCCH, which is beneficial for improving the probability of successful channel decoding of the PDCCH.

Figure 7:
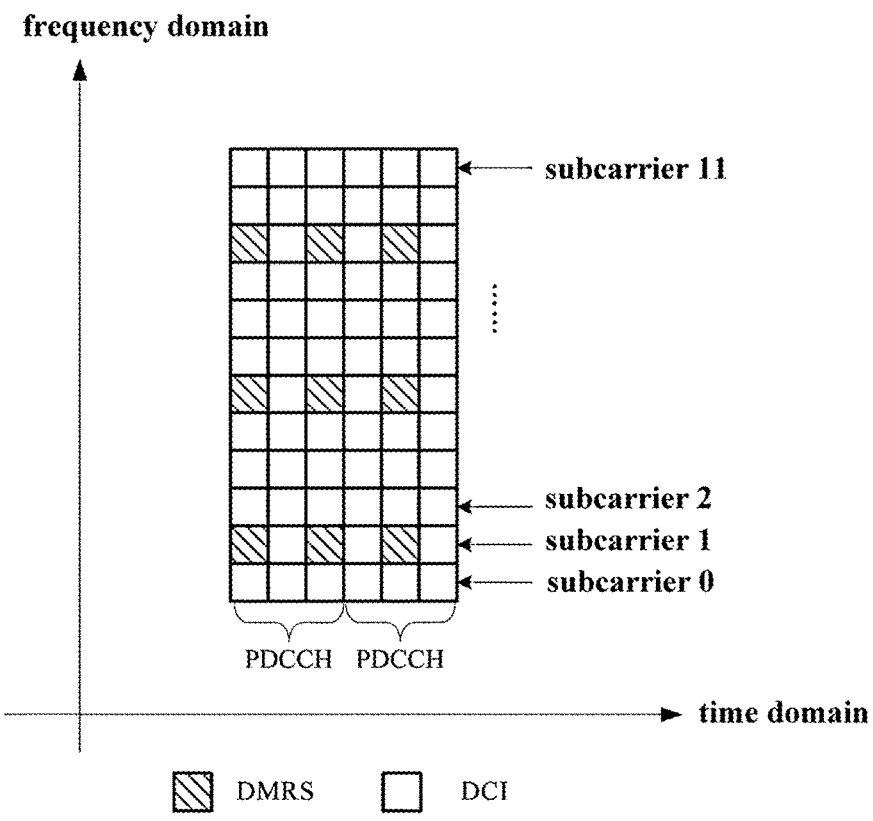
FIG. 7 is a schematic diagram of another DMRS illustrated according to an embodiment of the present disclosure.
Figure 8A:
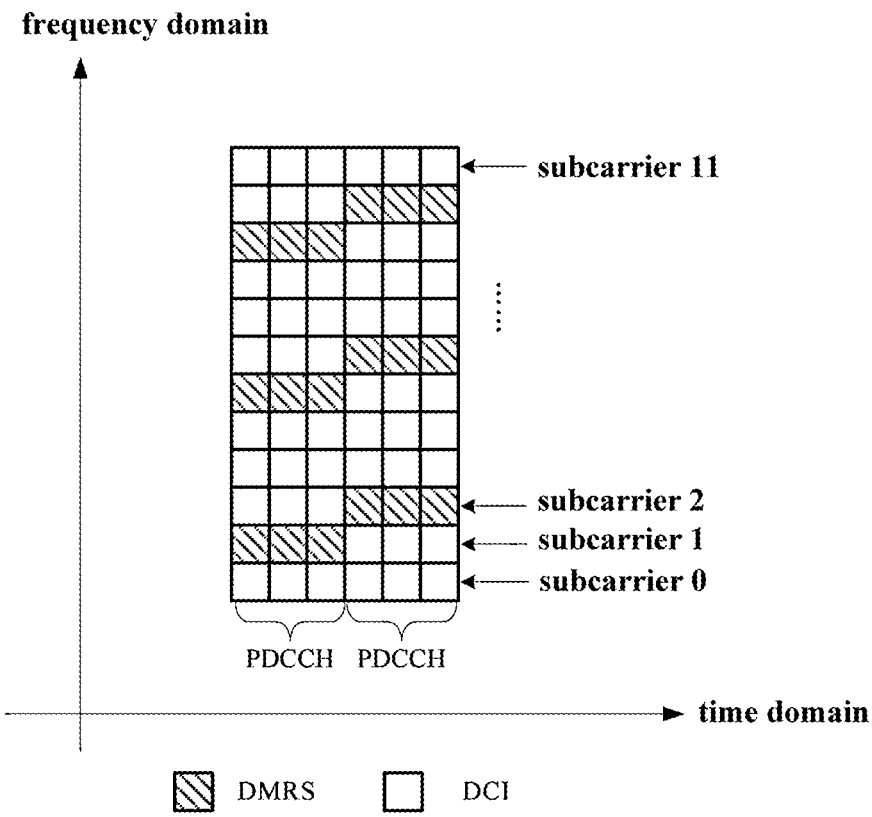
Figure 8B:
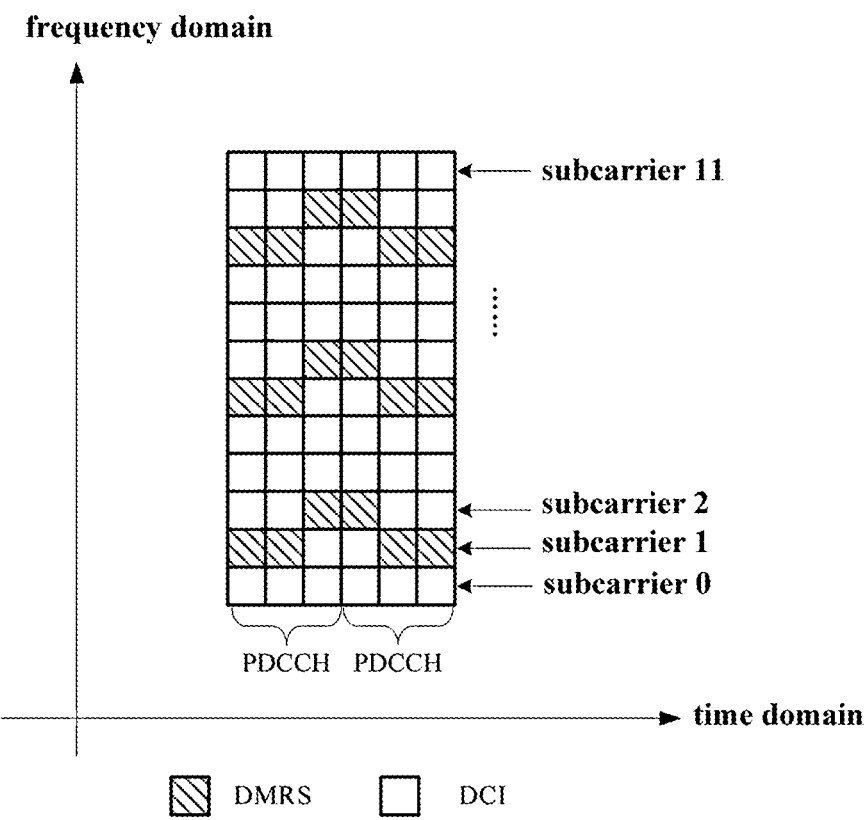
Figure 8C:
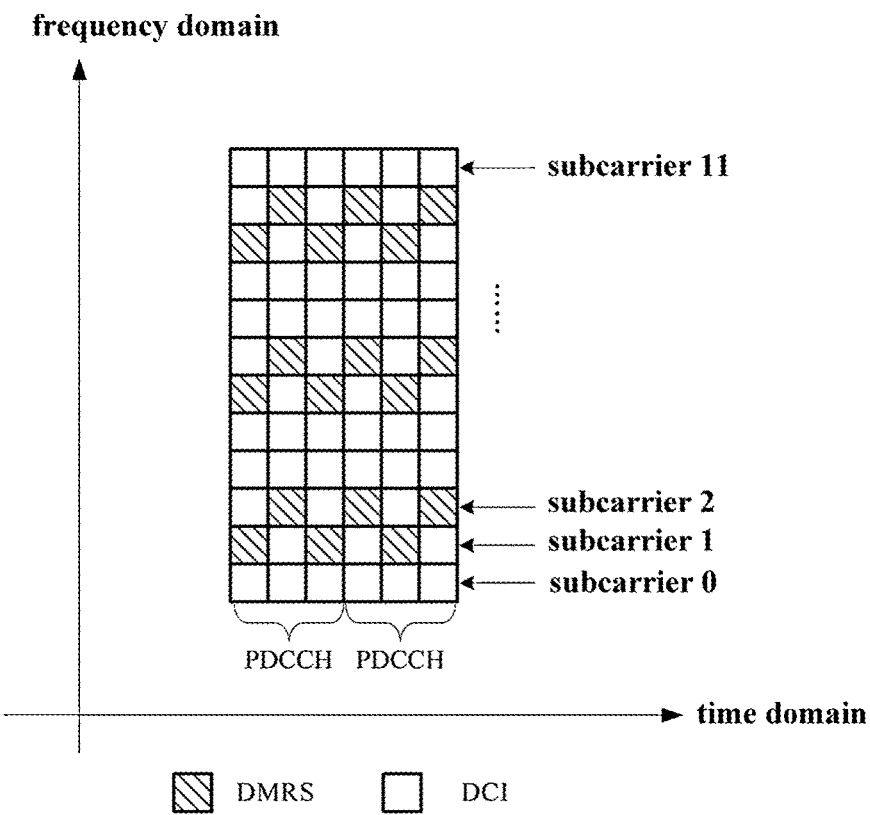
Figure 8D:
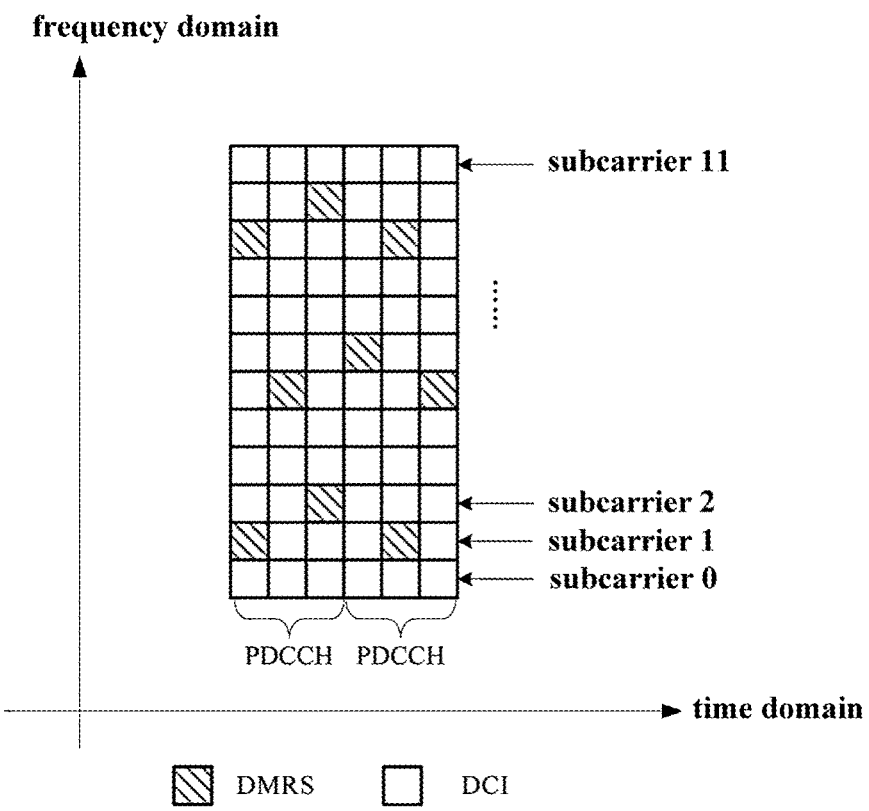

FIG. 6 is a schematic diagram of a DMRS illustrated according to an embodiment of the present disclosure. FIG. 7 is a schematic diagram of another DMRS illustrated according to an embodiment of the present disclosure.

For example, a PDCCH configured at a base station for a UE occupies 3 symbols in the time domain and 12 subcarriers in the frequency domain. As shown in FIG. 6, for example, for a UE with a nonstationary position, the DMRSs may be configured on subcarrier 1, subcarrier 5, and subcarrier 9, and the DMRS is set on each symbol. As shown in FIG. 7, for example, for a UE with a stationary position, the DMRSs may be configured on subcarrier 1, subcarrier 5, and subcarrier 9, but the DMRS is set on every other symbol.

It can be seen that based on the embodiment shown in FIG. 7, there are fewer DMRSs in the PDCCH, and correspondingly, there are more DCIs in the PDCCH. Based on this, it is possible to increase the number of DCIs and/or encoding bits in the PDCCH, which is beneficial for improving the probability of successful channel decoding of the PDCCH.

FIG. 8A~FIG. 8E are schematic diagrams of several DMRSs illustrated according to an embodiment of the present disclosure.

It should be noted that the location of the DMRS in the time and frequency domain is not limited to that shown in FIG. 6 and FIG. 7, and can be set as desired, including but not limited to any example shown in FIG. 8A to FIG. 8E.

FIG. 9 is a schematic flowchart of a PDCCH receiving method illustrated according to an embodiment of the present disclosure. The PDCCH receiving method shown in this embodiment may be applicable to a UE. The UE includes, but not limited to, a mobile phone, a tablet, a wearable device, a sensor, an IoT device, and other electronic devices. As a user equipment, the UE may communicate with a base station. The base station includes, but are not limited to, a 4G base station, a 5G base station, and a 6G base station. In one embodiment, the base station may be a base station to which the PDCCH transmission method described in any of the above embodiments applies.

In one embodiment, the UE may be a UE to which the PDCCH receiving method described in any of the subsequent embodiments applies.

In one embodiment, the UE is a reduced capability UE, or called a NR-lite device. For a UE of this type, low complexity, low cost, power saving, and a certain degree of coverage enhancement are required.

In order to meet the power saving requirements of this type of a UE, the UE may be set to only receive a PDCCH in a slot, and enter a micro-sleep state during periods other than the PDCCH in the slot. To meet its coverage enhancement requirements, the PDCCH may be transmitted multiple times to increase the aggregation level and reduce the code rate.

As shown in FIG. 9, the PDCCH receiving method may include the following step S901.

In the step 901, PDCCHs transmitted by a base station in multiple slots are received.

Herein, the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain.

According to the embodiments of the present disclosure, a base station may set PDCCHs transmitted to a UE in multiple slots, by setting the PDCCHs in at least two slots of the multiple slots to be consecutive in the time domain, the UE can be caused to, when receiving the PDCCHs consecutive in the time domain, wake up before receiving two PDCCHs consecutive in the time domain, remain awake during receiving the two PDCCHs consecutive in the time domain, and enter a micro-sleep state after receiving the two PDCCHs consecutive in the time domain, such that the UE can be caused to experience only one wake-up and micro-sleep entry process when receiving the PDCCHs consecutive in the time domain. Compared with inconsecutive transmission of the PDCCHs to the UE, the embodiments of the present disclosure can effectively reduce the power consumption of the UE and make the UE remain in a micro-sleep state for a longer time, thus facilitating meeting the power saving requirements of the UE.

FIG. 10 is a schematic flowchart of another PDCCH receiving method illustrated according to an embodiment of the present disclosure. As shown in FIG. 10, the method further includes the following step S1001.

In the step S1001, a downlink control information (DCI) corresponding to a same transport block is determine based on the PDCCHs in the multiple slots.

In one embodiment, the PDCCHs transmitted by the base station in the multiple slots may be for a plurality of transport blocks (TB s) or for the same transport block (TB).

Taking the PDCCHs in the multiple slots corresponding to the same transport block as an example, the PDCCH may carry a downlink control information (DCI). The DCI in each PDCCH may be the same, and the UE may determine, based on the PDCCHs in the multiple slots, the DCI corresponding to the same transport block.

Alternatively, the PDCCHs in the at least two slots are consecutive in the time domain includes:
the PDCCHs in the at least two slots being separated in the time domain by zero symbol.

In one embodiment, the PDCCHs in the at least two slots being consecutive in the time domain may be that, the PDCCHs in the at least two slots being separated in the time domain by zero symbol.

Alternatively, the PDCCHs in the at least two slots are consecutive in the time domain includes:
the PDCCHs in the at least two slots being separated in the time domain by one or more symbols, and a number of the one or more symbols is greater than zero and less than or equal to a preset value.

In one embodiment, the PDCCHs in the at least two slots being consecutive in the time domain may be that, the PDCCHs in the at least two slots being separated in the time domain by one or more symbols, and a number of the one or more symbols is greater than zero and less than or equal to a preset value.

Since the PDCCHs in different slots are consecutive, the complexity of blind detections is increased for the UE. For example, for the embodiment shown in FIG. 4, the UE needs to blindly detect the PDCCH in the third slot immediately after blindly detecting the PDCCH in the second slot. This may make it difficult for the UE to perform the blind detection smoothly in the third slot when the UE's processing capacity is low.

Since consecutive PDCCHs may be set to have a small interval in the time domain, for example, the number of spaced symbols being greater than 0 and less than or equal to a preset value, for example, the number of spaced symbols being 2, 3, etc., the UE can have more time for processing after blindly detecting in one slot and then blindly detecting in the next slot, which is applicable to a UE with a lower processing capacity.

Alternatively, in response to the PDCCHs in the at least two slots of the multiple slots being consecutive in the time domain, a number of blind detections of the PDCCH in a single slot is a first count, and in response to the PDCCHs in each slot of the multiple slots being inconsecutive in the time domain, the number of the blind detections of the PDCCH in the single slot is a second count.

Herein, the first count is less than the second count.

In one embodiment, since the PDCCHs in different slots are consecutive, the complexity of blind detections is increased for the UE. For example, for the embodiment shown in FIG. 4, the UE needs to blindly detect the PDCCH in the third slot immediately after blindly detecting the PDCCH in the second slot. This may make it difficult for the UE to perform the blind detection smoothly in the third slot when the UE's processing capacity is low.

The PDCCHs transmitted by the base station to the UE may be as described in the above embodiment that, the PDCCHs in at least two slots of the multiple slots are consecutive in the time domain. The PDCCHs transmitted by the base station to the UE may also be that the PDCCHs in each slot of the multiple slots are inconsecutive in the time domain. For cases where the PDCCHs in each slot of the multiple slots are inconsecutive in the time domain, the complexity of blind detections is low, and a higher number of blind detections may be set for each slot, such as the second count. For cases where the PDCCHs in at least two slots of the multiple slots are consecutive in the time domain, the complexity of blind detections is higher, and a smaller number of blind detections may be set for each slot, such as the first count. That is, the first count is less than the second count.

Accordingly, it can be ensured that for the cases where the PDCCHs in at least two slots of the multiple slots are consecutive in the time domain, the UE performs fewer blind detections in the slot in order to devote more capacity to processing consecutive PDCCHs, which is applicable to a UE with a lower processing capacity.

Figure 11:
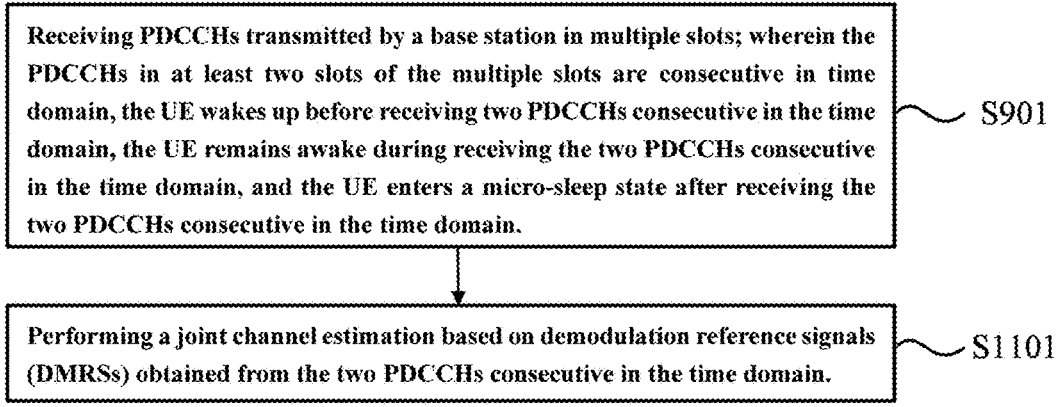
FIG. 11 is a schematic flowchart of another PDCCH receiving method illustrated according to an embodiment of the present disclosure.

FIG. 11 is a schematic flowchart of another PDCCH receiving method illustrated according to an embodiment of the present disclosure. As shown in FIG. 11, the method further includes the following step S1101.

In the step S1101, a joint channel estimation is performed based on demodulation reference signals (DMRSs) obtained from the two PDCCHs consecutive in the time domain.

In one embodiment, for two consecutive PDCCHs, the UE may obtain the DMRS of the DCI from each PDCCH and perform a joint channel estimation based on the DMRSs of the two PDCCHs, which is beneficial for improving the accuracy of channel decoding.

Alternatively, in response to a position of the UE being stationary, a number of DMRSs obtained from the PDCCH is a first number, and in response to the position of the UE being nonstationary, the number of the DMRSs obtained from the PDCCH is a second number.

Herein, the first number is less than the second number.

In one embodiment, a DCI and a DMRS may be carried in the PDCCH, and one of the functions of the DMRS is for the UE to combat Doppler frequency offset. The faster the moving speed of the UE, the greater the Doppler frequency offset. Therefore, a larger number of DMRSs are needed to combat Doppler frequency offset. However, for UE that move slowly or even do not move, the Doppler frequency offset is smaller, and a smaller number of DMRSs can combat the Doppler frequency offset.

This embodiment may determine whether the position of the UE is stationary. Whether the position of the UE is stationary may be determined by positioning the UE, or be determined based on the information reported by the UE, or may also be other feasible ways, which can be selected according to the need, and this embodiment is not limited.

For a UE with a stationary position, such as a stationary redcap UE, the number of the DMRSs in the PDCCH transmitted by the base station is the first number, and for a UE with a nonstationary position, the number of the DMRSs in the PDCCH transmitted by the base station is the second number, herein the first number may be less than the second number, i.e., the number of the DMRSs configured for the UE with a stationary position may be less relative to the number of the DMRSs configured for the UE with a nonstationary position, thus reducing the number of the DMRSs carried in the PDCCH, allowing for more DCIs and/or encoding bits to be carried in the PDCCH, which is beneficial for improving the probability of successful channel decoding of the PDCCH.

Corresponding to the aforementioned embodiments of the PDCCH transmission method and the PDCCH receiving method, the present disclosure also provides embodiments of the PDCCH transmission apparatus and the PDCCH receiving apparatus.

Figure 12:
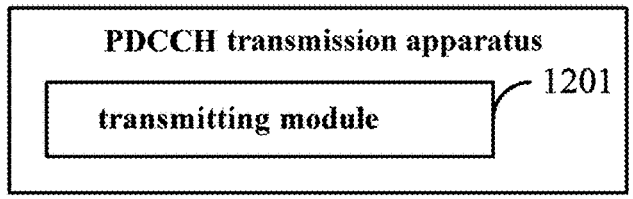
FIG. 12 is a schematic block diagram of a PDCCH transmission apparatus illustrated according to an embodiment of the present disclosure.

FIG. 12 is a schematic block diagram of a PDCCH transmission apparatus illustrated according to an embodiment of the present disclosure. The PDCCH transmission apparatus illustrated in this embodiment is applicable to a base station. The base station includes, but are not limited to, a 4G base station, a 5G base station, and a 6G base station. The base station may communicate with a UE as a user equipment, and the UE includes, but not limited to, a mobile phone, a tablet, a wearable device, a sensor, an IoT device, and other electronic devices.

As shown in FIG. 12, the PDCCH transmission apparatus may include the following module 1201.

A transmitting module 1201, configured to transmit, in multiple slots, PDCCHs to a UE.

Herein, the PDCCHs in at least two slots of the multiple slots are consecutive in time domain.

Alternatively, the PDCCHs in the multiple slots correspond to a same transport block.

Alternatively, the PDCCH in an odd slot of the multiple slots is located at a rear end of a corresponding slot, and the PDCCH in an even slot is located at a front end of a corresponding slot;
or
the PDCCH in an odd slot of the multiple slots is located at a front end of a corresponding slot, and the PDCCH in an even slot is located at a rear end of a corresponding slot.

Alternatively, the PDCCHs in the at least two slots are consecutive in the time domain includes:
the PDCCHs in the at least two slots being separated in the time domain by zero symbol.

Alternatively, the PDCCHs in the at least two slots are consecutive in the time domain includes:
the PDCCHs in the at least two slots being separated in the time domain by one or more symbols, and a number of the one or more symbols is greater than zero and less than or equal to a preset value.

Alternatively, in response to a position of the UE being stationary, a number of DMRSs in the PDCCH is a first number, and in response to the position of the UE being nonstationary, the number of the DMRSs in the PDCCH is a second number.

Herein, the first number is less than the second number.

Figure 13:
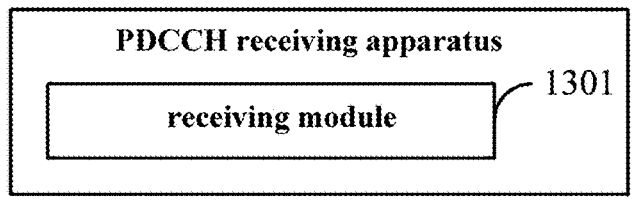
FIG. 13 is a schematic block diagram of a PDCCH receiving apparatus illustrated according to an embodiment of the present disclosure.

FIG. 13 is a schematic block diagram of a PDCCH receiving apparatus illustrated according to an embodiment of the present disclosure. The PDCCH receiving apparatus illustrated in this embodiment may be applicable to a UE. The UE includes, but not limited to, a mobile phone, a tablet, a wearable device, a sensor, an IoT device, and other electronic devices. As a user equipment, the UE may communicate with a base station. The base station includes, but are not limited to, a 4G base station, a 5G base station, and a 6G base station. In one embodiment, the base station may be a base station to which the PDCCH transmission method described in any of the above embodiments applies.

In one embodiment, the PDCCH receiving apparatus may include the following module 1301.

A receiving module 1301, configured to receive PDCCHs transmitted by a base station in multiple slots.

Herein, the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain.

Figure 14:
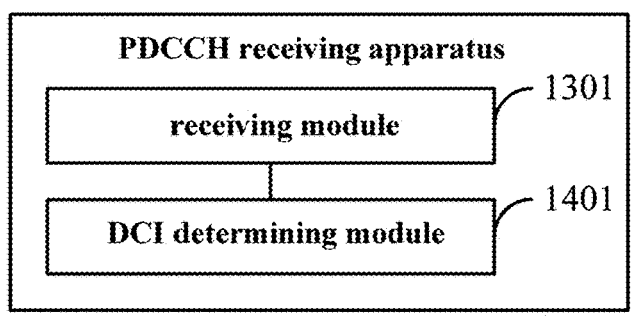
FIG. 14 is a schematic block diagram of another PDCCH receiving apparatus illustrated according to an embodiment of the present disclosure.

FIG. 14 is a schematic block diagram of another PDCCH receiving apparatus illustrated according to an embodiment of the present disclosure. As shown in FIG. 14, the apparatus may further include the following module 1401.

A DCI determining module 1401, configured to determine, based on the PDCCHs in the multiple slots, a downlink control information (DCI) corresponding to a same transport block.

Alternatively, the PDCCHs in the at least two slots are consecutive in the time domain includes:
the PDCCHs in the at least two slots being separated in the time domain by zero symbol.

Alternatively, the PDCCHs in the at least two slots are consecutive in the time domain includes:
the PDCCHs in the at least two slots being separated in the time domain by one or more symbols, and a number of the one or more symbols is greater than zero and less than or equal to a preset value.

Alternatively, in response to the PDCCHs in the at least two slots of the multiple slots being consecutive in the time domain, a number of blind detections of the PDCCH in a single slot is a first count, and in response to the PDCCHs in each slot of the multiple slots being inconsecutive in the time domain, the number of the blind detections of the PDCCH in the single slot is a second count.

Herein, the first count is less than the second count.

Figure 15:
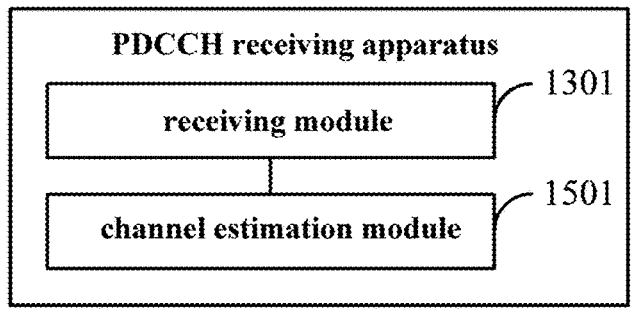
FIG. 15 is a schematic block diagram of yet another PDCCH receiving apparatus illustrated according to an embodiment of the present disclosure.

FIG. 15 is a schematic block diagram of yet another PDCCH receiving apparatus illustrated according to an embodiment of the present disclosure. As shown in FIG. 15, the apparatus further includes the following module 1501.

A channel estimation module 1501, configured to perform a joint channel estimation based on DMRSs obtained from the two PDCCHs consecutive in the time domain.

Alternatively, in response to a position of the UE being stationary, a number of DMRSs obtained from the PDCCH is a first number, and in response to the position of the UE being nonstationary, the number of the DMRSs obtained from the PDCCH is a second number.

Herein, the first number is less than the second number.

With respect to the apparatus of the above embodiments, the specific ways in which each module performs operations have been described in detail in the relevant method embodiments, and will not be described in detail here.

For apparatus embodiments, since they basically correspond to the method embodiments, please refer to the partial explanation of the method embodiments for relevant information. The apparatus embodiments described above are only schematic, where the modules described as separate components may be or may not be physically separated, and the components displayed as modules may be or may not be physical modules, which may be located in one place or distributed across a plurality of network modules. Some or all modules may be selected according to actual needs to achieve the purpose of the embodiment. Those ordinary skilled in the art can understand and implement without creative labor.

The embodiments of the present disclosure disclose an electronic device, including:
a processor; and
a memory, configured to store instructions executable by the processor.

Herein, the processor is configured to execute the PDCCH transmission method described in any one of the above embodiments.

The embodiments of the present disclosure disclose an electronic device, including:
a processor; and
a memory, configured to store instructions executable by the processor.

Herein, the processor is configured to execute the PDCCH receiving method described in any one of the above embodiments.

The embodiments of the present disclosure disclose a computer-readable storage medium, storing a computer program, herein, the computer program, when executed by a processor, implements steps of the PDCCH transmission method described in any one of the above embodiments.

The embodiments of the present disclosure disclose a computer-readable storage medium, storing a computer program, wherein the computer program, when executed by a processor, implements steps of the PDCCH receiving method described in any one of the above embodiments.

Figure 16:
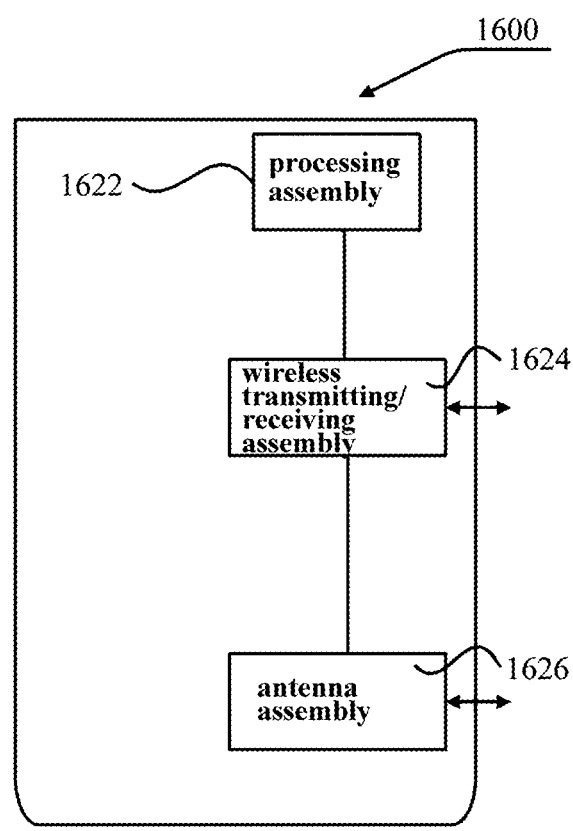
FIG. 16 is a schematic block diagram of an apparatus for transmitting PDCCHs illustrated according to an embodiment of the present disclosure.

As shown in FIG. 16, FIG. 16 is a schematic block diagram of an apparatus 1600 for transmitting PDCCHs illustrated according to an embodiment of the present disclosure. The apparatus 1600 may be provided as a base station. Referring to FIG. 16, the apparatus 1600 includes a processing assembly 1622, a wireless transmitting/receiving assembly 1624, an antenna assembly 1626, and a signal processing portion specific to the wireless interface, and the processing assembly 1622 may further include one or more processors. One of the processors of the processing assembly 1622 may be configured to implement the PDCCH transmission method described in any one of the above embodiments.

Figure 17:
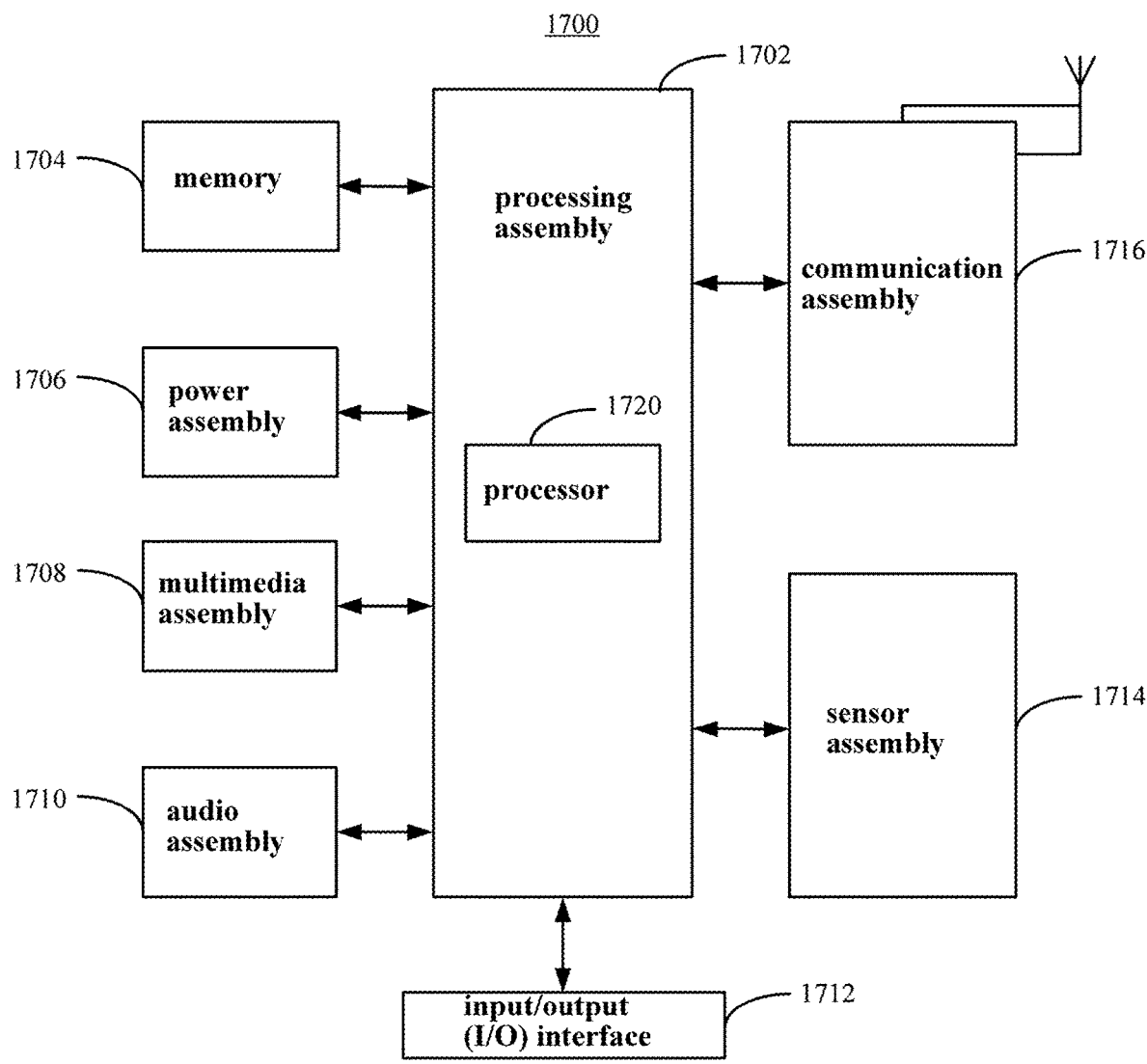
FIG. 17 is a schematic block diagram of an apparatus for receiving PDCCHs illustrated according to an embodiment of the present disclosure.

FIG. 17 is a schematic block diagram of an apparatus 1700 for receiving PDCCHs illustrated according to an embodiment of the present disclosure. For example, the apparatus 1700 may be a mobile phone, a computer, a digital broadcasting UE, a messaging device, a game console, a tablet device, a medical device, a fitness device, a personal digital assistant, etc.

Referring to FIG. 17, the apparatus 1700 may include one or more of the following assemblies: a processing assembly 1702, a memory 1704, a power assembly 1706, a multimedia assembly 1708, an audio assembly 1710, an input/output (I/O) interface 1712, a sensor assembly 1714, and a communication assembly 1716.

The processing assembly 1702 generally controls the overall operation of the apparatus 1700, such as operations associated with display, telephone calls, data communication, camera operations, and recording operations. The processing assembly 1702 may include one or more processors 1720 to execute instructions to complete all or some of the steps of the PDCCH receiving method described above. In addition, the processing assembly 1702 may include one or more modules to facilitate interaction between the processing assembly 1702 and other assemblies. For example, the processing assembly 1702 may include a multimedia module to facilitate interaction between the multimedia assembly 1708 and the processing assembly 1702.

The memory 1704 is configured to store various types of data to support operation at the apparatus 1700. Examples of such data include the following for any application or method to operate on the apparatus 1700: instructions, contact data, phonebook data, messages, pictures, videos, etc. The memory 1704 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or a CD-ROM.

The power supply assembly 1706 provides power to various assemblies of the assembly 1700. The power supply assembly 1706 may include a power management system, one or more power supplies, and other assemblies associated with generating, managing, and distributing power for the apparatus 1700.

The multimedia assembly 1708 includes a screen that provides an output interface between the apparatus 1700 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia assembly 1708 includes a front-facing camera and/or a rear-facing camera. The front camera and/or rear camera may receive external multimedia data when the apparatus 1700 is in an operating mode, such as a shooting mode or a video mode. Each front-facing camera and rear-facing camera may be a fixed optical lens system or have a focal length and optical zoom capability.

The audio assembly 1710 is configured to output and/or input audio signals. For example, the audio assembly 1710 includes a microphone (MIC) configured to receive external audio signals when the apparatus 1700 is in an operating mode, such as a call mode, a recording mode, and a voice recognition mode. The received audio signals may be further stored in the memory 1704 or sent via the communication assembly 1716. In some embodiments, the audio assemblies 1710 further includes a speaker for outputting the audio signals.

The I/O interface 1712 provides an interface between the processing assembly 1702 and a peripheral interface module, and the peripheral interface module may be a keypad, a click wheel, a button, etc. These buttons may include, but not limited to, a home button, a volume button, a start button, and a lock button.

The sensor assembly 1714 includes one or more sensors, used for providing a status assessment of various aspects of the apparatus 1700. For example, the sensor assembly 1714 may detect an open/closed state of the apparatus 1700, relative positioning of assembly, for example, the assembly is the display and keypad of the apparatus 1700, the sensor assembly 1714 may also detect a change in the position of the apparatus 1700 or a change in the position of one assembly of the apparatus 1700, the presence or absence of user contact with the apparatus 1700, the orientation or acceleration/deceleration of the apparatus 1700, and temperature changes of the apparatus 1700. The sensor assembly 1714 may include a proximity sensor configured to detect the presence of nearby objects in the absence of any physical contact. The sensor assembly 1714 may also include a light sensor, such as a CMOS or CCD image sensor, for use in imaging applications. In some embodiments, the sensor assembly 1714 may also include an accelerometer sensor, a gyroscope sensor, a magnetic sensor, a pressure sensor, or a temperature sensor.

The communication assembly 1716 is configured to facilitate communication between the apparatus 1700 and other devices by wired or wireless means. The apparatus 1700 may access a wireless network based on a communication standard such as WiFi, 2G or 3G, 4G LTE, 5G NR, or a combination thereof. In one embodiment, the communication assembly 1716 receives broadcast signals or broadcast-related information from an external broadcast management system via a broadcast channel. In an embodiment, the communication assembly 1716 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In one embodiment, the apparatus 1700 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the above PDCCH receiving method.

In one embodiment, a non-transitory computer-readable storage medium including instructions is provided, such as a memory 1704 including instructions, the above instructions being executable by the processor 1720 of the apparatus 1700 to complete the above PDCCH receiving method. For example, the non-transitory computer-readable storage medium may be a ROM, a random access memory (RAM), a CD-ROM, a magnetic tape, a floppy disk, an optical data storage device, etc.

In one embodiment, a physical downlink control channel (PDCCH) transmission apparatus, applicable to a base station, is proposed. The PDCCH transmission apparatus includes:

a transmitting module, configured to transmit, in multiple slots, PDCCHs to a UE.

Herein, the PDCCHs in at least two slots of the multiple slots are consecutive in time domain.

In one embodiment, a physical downlink control channel (PDCCH) receiving apparatus, applicable to a UE, is proposed. The PDCCH receiving apparatus includes:

a receiving module, configured to receive PDCCHs transmitted by a base station in multiple slots;

Herein, the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain.

According to the embodiments of the present disclosure, when transmitting PDCCHs to a UE in multiple slots, by setting the PDCCHs in at least two slots of the multiple slots to be consecutive in the time domain, the UE can be caused to experience only one wake-up and micro-sleep entry process when receiving the PDCCHs consecutive in the time domain. Compared with inconsecutive transmission of the PDCCHs to the UE, the embodiments of the present disclosure can effectively reduce the power consumption of the UE and make the UE remain in a micro-sleep state for a longer time, thus facilitating meeting the power saving requirements of the UE.

Those skilled in the art will easily think of other embodiments of the present disclosure after considering the description and practicing the present disclosure. The present disclosure is intended to cover any variant, use or adaptive change of the present disclosure. These variants, uses or adaptive changes follow the general principles of the present disclosure and include the common knowledge or commonly used technical means in the technical field not disclosed in the present disclosure. The description and the embodiments are only regarded as illustrative. The true scope and spirit of the present disclosure are indicated by the following claims.

It should be understood that the present disclosure is not limited to the precise structure described above and shown in the drawings, and various modifications and changes can be made without departing from the scope of the present disclosure. The scope of the present disclosure is limited only by the appended claims.

It should be noted that in this article, relational terms such as first and second are only used to distinguish one entity or operation from another entity or operation, and do not necessarily require or imply any actual relationship or order between these entities or operations. The terms "include", "comprise", and any other variation thereof, are intended to cover non-exclusive inclusion, such that a process, method, item, or apparatus that includes a series of elements not only includes those elements, but also other elements that are not explicitly listed, or also includes elements inherent in such a process, method, item, or apparatus. Without further limitations, the elements limited by the statement "including one . . . " do not exclude the existence of other identical elements in the process, method, item, or apparatus that includes the elements.

The above provides a detailed introduction to the methods and apparatus provided in the disclosed embodiments. Specific examples are applied in this article to explain the principles and implementation methods of the present disclosure. The explanations of the above embodiments are only used to help understand the methods and core ideas of the present disclosure. Meanwhile, for those general skilled in the art, based on the ideas of the present disclosure, there may be changes in specific implementation methods and application scope. In summary, the content of the specification should not be understood as a limitation of the present disclosure.

What is claimed is:

1. A physical downlink control channel (PDCCH) transmission method, performed by a base station, comprising:
    transmitting, in multiple slots, PDCCHs to a user equipment (UE);
    wherein the PDCCHs in at least two slots of the multiple slots are consecutive in time domain; and
    wherein a PDCCH in an odd slot of the multiple slots is located at a rear end of the odd slot, and a PDCCH in an even slot of the multiple slots is located at a front end of the even slot; or a PDCCH in an odd slot of the multiple slots is located at a front end of the odd slot, and a PDCCH in an even slot of the multiple slots is located at a rear end of the even slot.

2. The PDCCH transmission method according to claim 1, wherein the PDCCHs in the multiple slots correspond to a same transport block.

3. The PDCCH transmission method according to claim 1, wherein
    the PDCCHs in the at least two slots are separated in the time domain by zero symbol.

4. The PDCCH transmission method according to claim 1, wherein
    the PDCCHs in the at least two slots are separated in the time domain by one or more symbols, and a number of the one or more symbols is greater than zero and less than or equal to a preset value.

5. The PDCCH transmission method according to claim 1, wherein in response to a position of the UE being stationary, a number of demodulation reference signals (DMRSs) in the PDCCH is a first number, and in response to the position of the UE being nonstationary, the number of the DMRSs in the PDCCH is a second number;
    wherein the first number is less than the second number.

6. A non-transitory computer-readable storage medium, storing a computer program, wherein the computer program, when executed by a processor, implements steps of the PDCCH transmission method of claim 1.

7. A physical downlink control channel (PDCCH) receiving method, performed by a user equipment (UE), comprising:
    receiving PDCCHs transmitted by a base station in multiple slots;
    wherein the PDCCHs in at least two slots of the multiple slots are consecutive in time domain, the UE wakes up before receiving two PDCCHs consecutive in the time domain, the UE remains awake during receiving the two PDCCHs consecutive in the time domain, and the UE enters a micro-sleep state after receiving the two PDCCHs consecutive in the time domain; and
    wherein a PDCCH in an odd slot of the multiple slots is located at a rear end of the odd slot, and a PDCCH in an even slot of the multiple slots is located at a front end of the even slot; or a PDCCH in an odd slot of the multiple slots is located at a front end of the odd slot, and a PDCCH in an even slot of the multiple slots is located at a rear end of the even slot.

8. The PDCCH receiving method according to claim 7, further comprising:
    determining, based on the PDCCHs in the multiple slots, a downlink control information (DCI) corresponding to a same transport block.

9. The PDCCH receiving method according to claim 7, wherein
    the PDCCHs in the at least two slots are separated in the time domain by zero symbol.

10. The PDCCH receiving method according to claim 7, wherein
    the PDCCHs in the at least two slots are separated in the time domain by one or more symbols, and a number of the one or more symbols is greater than zero and less than or equal to a preset value.

11. The PDCCH receiving method according to claim 7, wherein in response to the PDCCHs in the at least two slots of the multiple slots being consecutive in the time domain, a number of blind detections of the PDCCH in a single slot is a first count, and in response to the PDCCHs in each slot of the multiple slots being inconsecutive in the time domain, the number of the blind detections of the PDCCH in the single slot is a second count;

wherein the first count is less than the second count.

12. The PDCCH receiving method according to claim 7, further comprising:

performing a joint channel estimation based on demodulation reference signals (DMRSs) obtained from the two PDCCHs consecutive in the time domain.

13. The PDCCH receiving method according to claim 7, wherein in response to a position of the UE being stationary, a number of DMRSs obtained from the PDCCH is a first number, and in response to a position of the UE being nonstationary, the number of the DMRSs obtained from the PDCCH is a second number;

wherein the first number is less than the second number.

14. An electronic device, comprising:
a processor; and
a memory, configured to store instructions executable by the processor;
wherein the processor is configured to execute the PDCCH receiving method of claim 7.

15. A non-transitory computer-readable storage medium, storing a computer program, wherein the computer program, when executed by a processor, implements steps of the PDCCH receiving method of claim 7.

16. An electronic device, comprising:
a processor; and
a memory, configured to store instructions executable by the processor;
wherein the processor, through loading and executing the instructions, is configured to:
transmit, in multiple slots, physical downlink control channels (PDCCHs) to a user equipment (UE);
wherein the PDCCHs in at least two slots of the multiple slots are consecutive in time domain; and
wherein a PDCCH in an odd slot of the multiple slots is located at a rear end of the odd slot, and a PDCCH in an even slot of the multiple slots is located at a front end of the even slot; or a PDCCH in an odd slot of the multiple slots is located at a front end of the odd slot, and a PDCCH in an even slot of the multiple slots is located at a rear end of the even slot.

* * * * *